T. H. SEELY AND R. C. SIMMONS.
WELT GROOVING AND BEVELING MACHINE.
APPLICATION FILED APR. 27, 1916. RENEWED JUNE 19, 1919.
1,416,757.
Patented May 23, 1922.
4 SHEETS—SHEET 3.
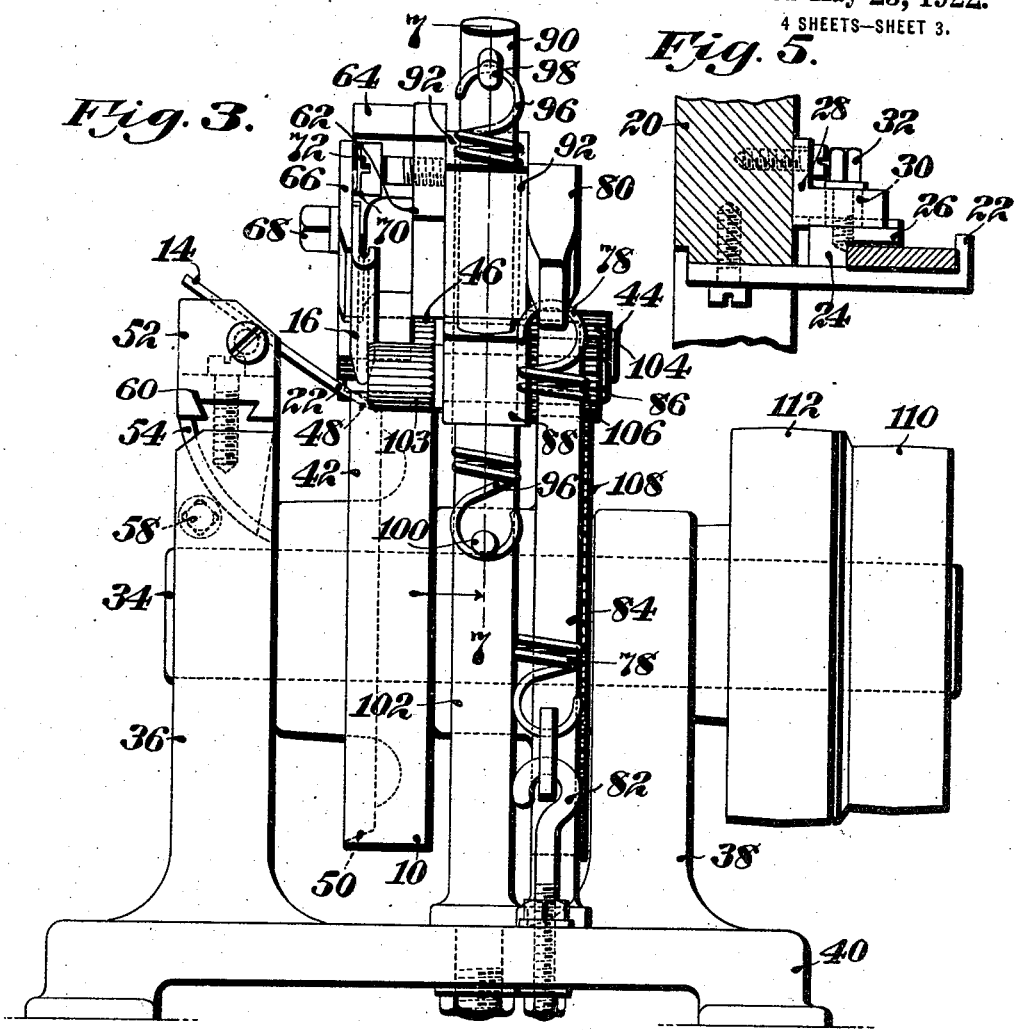
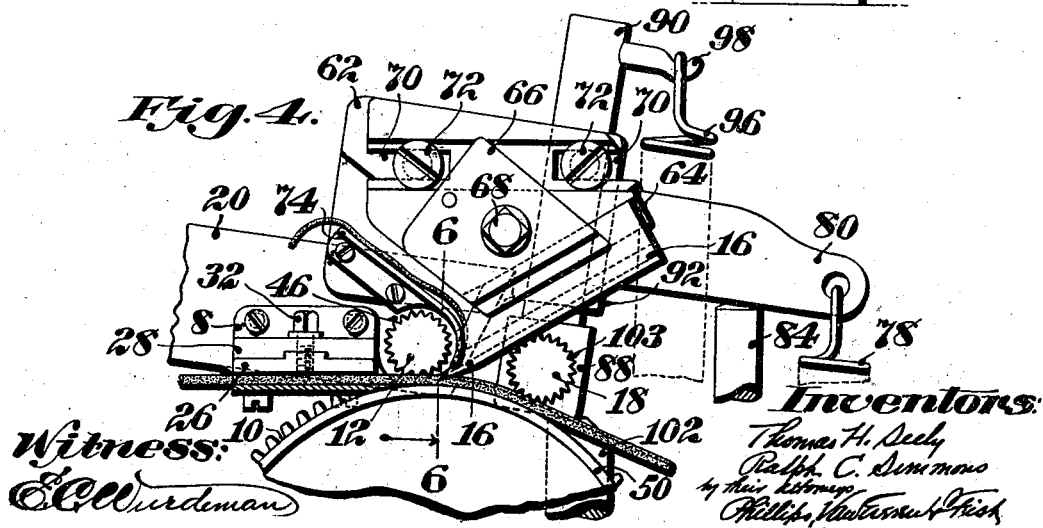

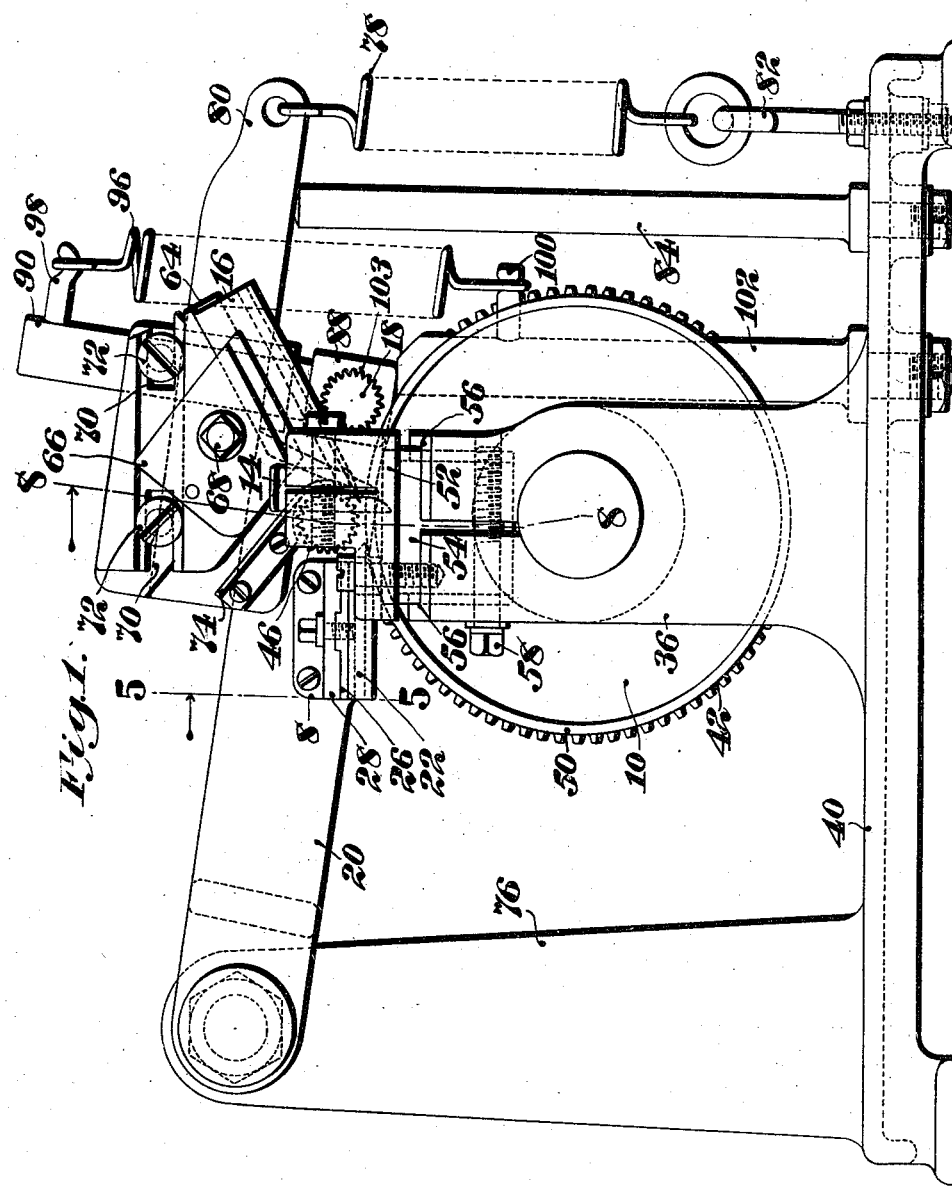

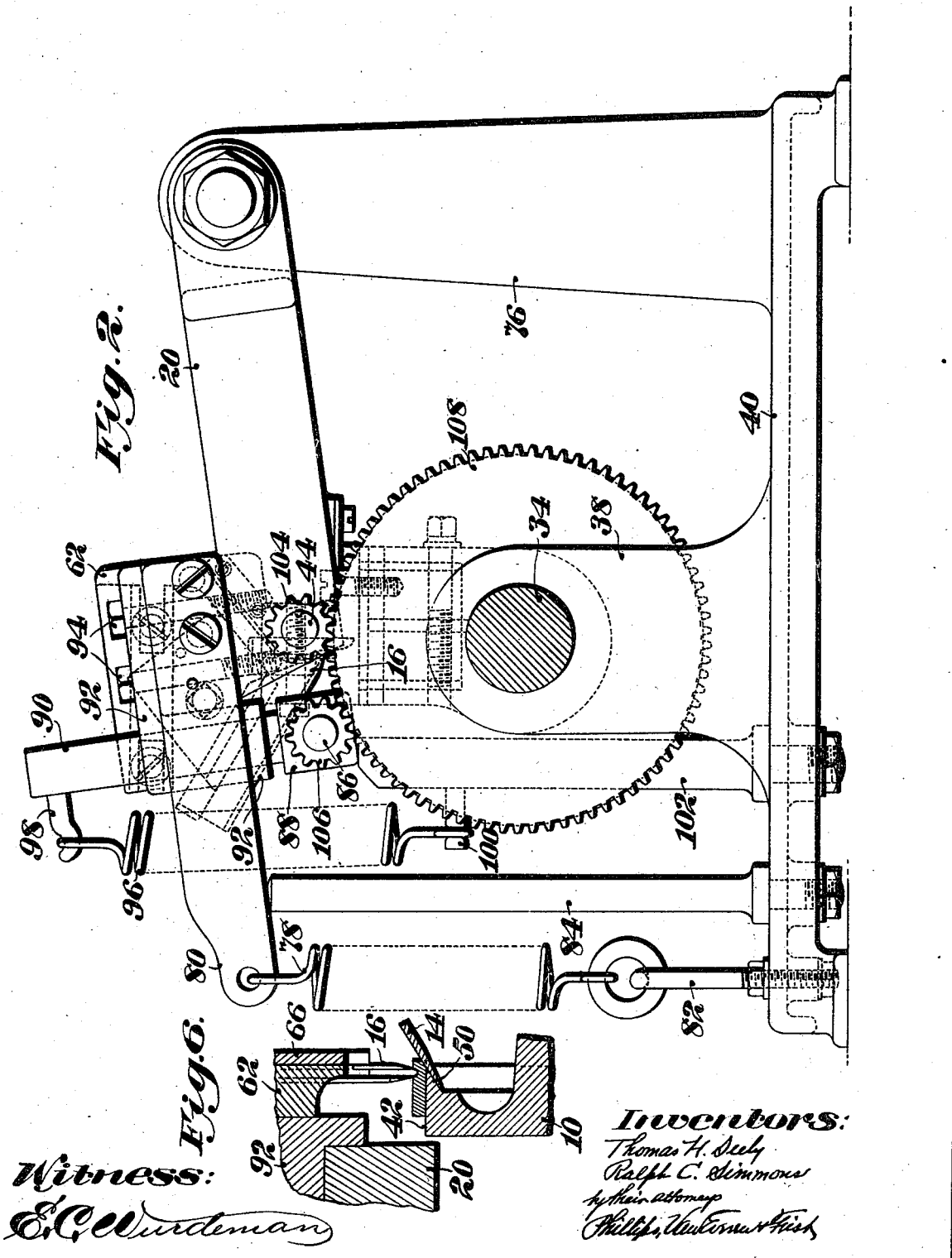

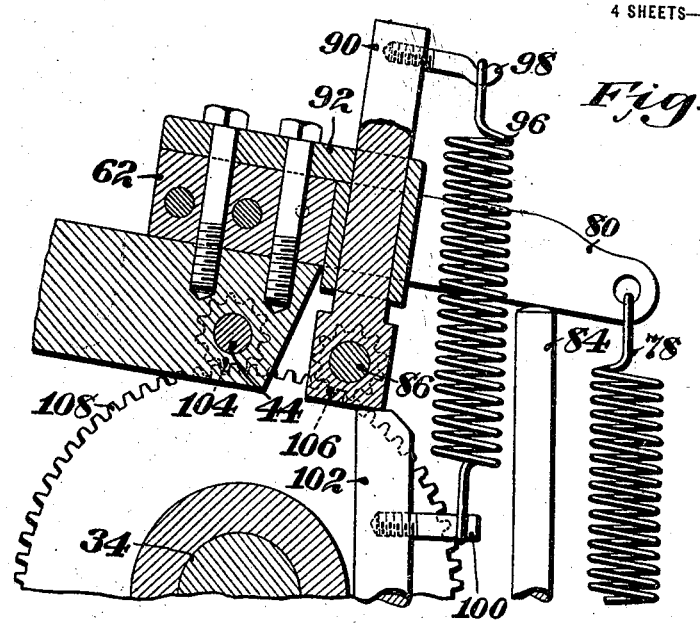
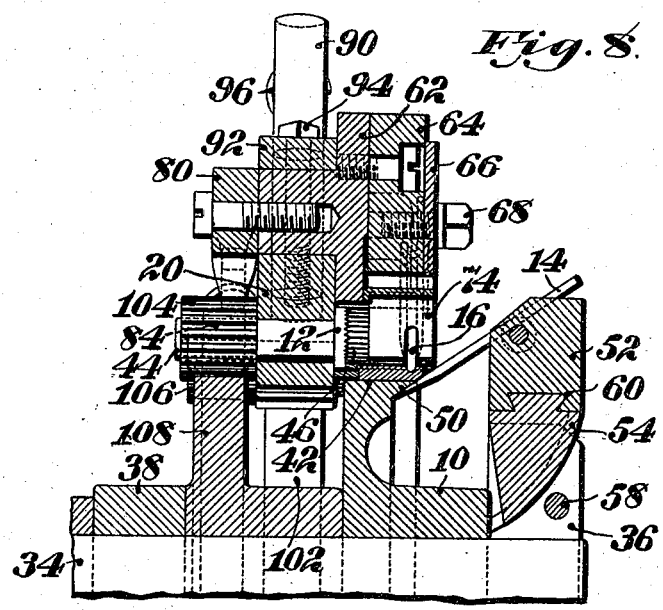

UNITED STATES PATENT OFFICE.

THOMAS H. SEELY, OF DORCHESTER, AND RALPH C. SIMMONS, OF BEVERLY, MASSACHUSETTS, ASSIGNORS, BY MESNE ASSIGNMENTS, TO UNITED SHOE MACHINERY CORPORATION, OF PATERSON, NEW JERSEY, A CORPORATION OF NEW JERSEY.

WELT GROOVING AND BEVELING MACHINE.

1,416,757.  Specification of Letters Patent.  Patented May 23, 1922.

Application filed April 27, 1916, Serial No. 93,888. Renewed June 19, 1919. Serial No. 305,394.

*To all whom it may concern:*

Be it known that we, THOMAS H. SEELY and RALPH C. SIMMONS, citizens of the United States, residing at Dorchester and Beverly, respectively, in the counties of Suffolk and Essex and Commonwealth of Massachusetts, have invented certain new and useful Improvements in Welt Grooving and Beveling Machines; and we hereby declare the following to be a full, clear, and exact description of the invention, such as will enable others skilled in the art to which it appertains to make and use the same.

This invention relates to welt grooving and beveling machines.

The object of the present invention is to produce a simple and efficient welt grooving and beveling machine having few parts as compared with machines of this class in use at the present time, and adapted to groove and bevel a strip of welt material throughout its entire length.

With this and other objects in view, the invention consists in the improved welt grooving and beveling machine hereinafter described and set forth in the claims.

The various features of the invention are illustrated in the accompanying drawings, in which Figure 1 is a view in side elevation of a welt grooving and beveling machine embodying the preferred form of the invention; Fig. 2 is a view in side elevation of the opposite side of the machine to that shown in Fig. 1; Fig. 3 is a view in front elevation of the machine shown in Fig. 1; Fig. 4 is a detail view showing the arrangement of the feeding rolls and grooving knife; Fig. 5 is a detail sectional view of the welt guide taken on the line 5—5 of Fig. 1; Fig. 6 is a detail sectional view of the feed rolls taken on the line 6—6 of Fig. 4; Fig. 7 is a sectional view on the line 7—7 of Fig. 3; and Fig. 8 is a sectional view on the line 8—8 of Fig. 1.

In preparing welting with the machine illustrated in the drawings, a welt strip of indeterminate length is passed through a welt guide 8 directly into the bite of a feed roll 12 and a supporting roll 10. As the welt passes from between the rolls 10 and 12, the bevel is formed by a beveling knife 14, and the groove is formed by a grooving knife 16. After being grooved and beveled, the welt passes between the supporting roll 10 and a pulling feed roll 18 and is discharged from the machine.

The welt strip is positioned by the welt guide 8 so that the groove and bevel cuts will have a predetermined position with relation to the inner groove edge of the welt. To accomplish this, the welt guide 8 is secured to the bottom of a carrier 20, and has an upstanding flange 22 which has a predetermined position with relation to the grooving and beveling knives. While the welt is being fed through the machine the inner edge of the welt is held against the flange 22 by an outer edge guide 24 which has a shoulder 26 to engage the outer edge of the welt. The outer edge guide 24 is mounted in a bracket 28 secured to the carrier 20, and is adjustable in the bracket toward and from the flange 22 by a slot 30 and set screw 32 to provide for different widths of welt.

As the welt emerges from the welt guide it enters directly between the feed roll 12 and supporting roll 10, and while held by these rolls is acted upon by the beveling and grooving knives. The supporting roll 10 is mounted upon a driving shaft 34 which is journaled in bearings 36 and 38 formed upon a base 40. The supporting roll has a comparatively large diameter and its rim 42 supports the grain side of the welt. The feed roll 12 has a comparatively small diameter and is formed on a shaft 44 which is journaled in the carrier 20 above the supporting roll. A series of feed teeth 46 are formed on the periphery of the feed roll to engage the flesh side of the welt. The welt guide positions the welt upon the supporting roll 10 with the inner edge projecting beyond the edge of the rim 42, and the feed roll 12 extends entirely across the flesh side of the welt and projects beyond the edge of the welt. The beveling knife 14 has a cutting edge 48 which is located approximately in the plane passing through the axes of the feed and supporting rolls and cuts the edge of the welt at the point where it is held between the outer edge of the rim 42 and the outer edge of the feed roll 12. To permit the cutting edge of the beveling knife to be positioned so as to extend across the outer edges of the rim 42 and feed roll 12, the under face of the rim is beveled at 50 to form a thin flange at its outer edge. The beveling knife projects across the bevel 50 and is mounted in a knife block 52 which is supported upon the bearing 36. The knife block 52 is secured to an adjusting block 54 which is adjustable, in arcuate grooves 56 formed in the upper end of the bearing 36, about the beveled flange of the rim 42 as a center. The bearing 36 is split between the guides 56, and the block 52 may be locked in adjusted position by means of a bolt 58. The knife block 52 has a tongue and groove connection 60 with the adjusting block 54, so that the knife 14 may be adjusted in the line of feed. With this construction the beveling knife can be adjusted to any desired angle to vary the form of the bevel, and the cutting edge may be adjusted in the line of feed to be properly positioned with reference to the rolls.

As the welt passes from between the feed roll 12 and supporting roll 10, it is grooved by the grooving knife 16, the cutting edge of which projects in between the feed roll and supporting roll. The diameter of the feed roll 12 is small, so that the cutting edge of the grooving knife 16 can project in between the rolls 10 and 12 close to the point of contact of the rolls with the welt. The grooving knife 16 is supported on the knife block 62 which is secured upon the end of the carrier 20. The knife block is provided with a knife holder 64 in which the knife is clamped by a clamping plate 66 and bolt 68. The knife holder is adjustable on the knife block in the line of feed by means of slots 70 and screws 72. With the adjustment of the knife in the holder 64 and the adjustment of the holder on the knife block, the cutting edge of the knife can be set in the desired position with relation to the line of contact of the feed roll 12 and supporting roll 10 with the welt. A shield 74 is attached to the knife block and projects around the feed roll 12 and down in front of the grooving knife 16 to prevent the waste strip from curling back and clogging the feed roll 12.

The carrier 20 upon which the feed roll 12 and grooving knife 16 are mounted is movable toward and from the supporting roll 10 to accommodate different thicknesses of welt. The carrier 20 is pivotally mounted upon a post 76 which is formed on the base 40, and is normally moved about the pivot under the tension of a spring 78 which acts to clamp the welt between the feed roll 12 and supporting roll and give an effective bite for feeding. The spring 78 is connected between an arm 80 extending out from the knife block 62 on the carrier and an eye-bolt 82 mounted in the base of the machine frame. To prevent the spring 78 from drawing the feed roll and grooving knife down into contact with the supporting roll, when no work is in the machine, a post 84 is mounted in the machine base 40 in position to engage the arm 80 and limit the approach of the carrier toward the supporting roll.

After the welt leaves the grooving knife it passes in under the pulling feed roll 18 which not only acts to draw the last end of the welt past the knives but co-operates with the feed roll 12 to keep the welt stretched tightly over the cylindrical supporting surface of the roll 10, so that the grooving knife cuts to better advantage and a uniform depth of groove is ensured. The feed roll 18 is formed on a shaft 86 which is journaled in a block 88 on the end of a movable plunger 90. The plunger 90 is slidably mounted in a bearing block 92 attached to the knife block 62 by means of screws 94, which also serve to attach the knife block to the carrier 20. To give the feed roll 18 a feeding grip on the welt, it is normally pressed toward the supporting roll 10 by a tension spring 96 which is connected between a pin 98 projecting from the plunger 90 and a pin 100 projecting from the upper end of a post 102 mounted in the machine base 40. A series of feeding teeth 103 are formed on the periphery of the feed roll, and its outer end is in line with the grooving knife so that the feeding teeth 103 contact only the flesh side of the welt between the groove and outer edge. With this construction the pulling feed roll 18 is yieldable independently of the feed roll 12 and will always act to give a pulling feed on the welt, irrespective of the position of the feed roll 12 or the carrier 20. To limit the movement of the feed roll 18 toward the supporting roll 10, the block 88 in which the shaft 86 is journaled, is arranged to engage the upper end of the post 102.

The feed rolls 12 and 18 are positively driven to feed the welt by means of pinions 104 and 106 mounted upon the ends of the shafts 44 and 86 respectively. The pinions 104 and 106 mesh with a spur gear 108 fixed on the driving shaft 34. The spur gear 108 has substantially the same diameter as the supporting roll 10, so that the feed rolls will move the welt with the same speed as that of the rim 42 of the supporting roll. The feed rolls 12 and 18, as well as the supporting roll 10, are thus positively driven, so that the welt is clamped and uniformly moved past the grooving and beveling knives. The main driving shaft 34 is provided with a loose pulley 110 and a tight pulley 112, which may be driven by any suitable source of power.

With the construction outlined above, the welt is delivered from the welt guide directly to the feed roll 12 and is acted upon immediately by the grooving and beveling knives while it is held accurately in position. The feed roll 12 clamps the welt upon the support during both the grooving and beveling cuts, and the feed roll 18 prevents any tendency of the welt to rise as it leaves the roll 12, so that these cuts are uniformly and accurately formed. The last end of the strip is pulled past the knives by the roll 18, so that the bevel is formed in the entire length of the strip.

The invention having been thus described, what is claimed as new is:—

1. A machine for operating on welting having, in combination, a support for a welt, guides for positioning the welt on the support with its inner edge projecting over the end of the support, a feed roll co-operating with the support and extending across the inner edge of the welt, and a beveling knife projecting under the support to operate on the inner edge of the welt under the feed roll.

2. A machine for operating on welting having, in combination, a welt supporting roll, guides for positioning the welt on the support with its inner edge projecting over the end of the roll, a feed roll co-operating with the supporting roll and extending across the inner edge of the welt, a grooving knife mounted behind the feed roll with its cutting edge extending substantially to the bite of the feed and supporting rolls, and a beveling knife projecting under the supporting roll to operate on the inner edge of the welt.

3. A machine for operating on welting having, in combination, a welt supporting roll having a beveled flange, guides for positioning the welt on the roll with one edge projecting outside of the edge of the flange, a feed roll co-operating with the supporting roll and extending completely across the welt, and a beveling knife having its cutting edge projecting under and across said beveled flange.

4. A machine for preparing welting having, in combination, a supporting roll having a beveled flange, a feed roll co-operating with the supporting roll, a beveling knife projecting under the beveled flange of the supporting roll, and means to permit adjustment of the knife to different angular positions about the edge of the beveled flange as an axis to vary the angle of the bevel cut.

5. A welt preparing machine having, in combination, a suporting roll having a beveled flange, guides for positioning the welt on the outer surface of the flange with one edge projecting over the edge of the flange, a feed roll co-operating with the supporting roll, a beveling knife projecting under the beveled flange, means to permit adjustment of the knife to different angular positions about the edge of the flange, and means to permit adjustment of the knife in the line of feed.

6. A welt grooving and beveling machine having, in combination, a welt supporting roll, guides for positioning the welt on the supporting roll with the inner edge projecting over the end of the roll, a feed roll co-operating with the supporting roll and extending across the inner edge of the welt, a beveling knife below said feed roll with its cutting edge projecting under the supporting roll, a grooving knife at the rear of the feed roll with its cutting edge acting on the welt at the line of contact of the roll with the welt, and an auxiliary feed roll at the rear of the grooving knife.

7. A welt grooving and beveling machine having, in combination, a welt support, a feed roll cooperating with the support to feed the welt, a beveling knife and a grooving knife acting on the welt close to the line of contact of the roll with the welt, and a second feed roll at the rear of the knives to draw the welt past the knives.

8. A machine for operating on welting having, in combination, a comparatively large welt supporting roll, a comparatively small feed roll cooperating with the supporting roll, a grooving knife between the rolls at the rear of and close to the point of contact of the rolls with the welt, and a shield between the feed roll and the knife.

9. A machine for operating on welting having, in combination, a support to engage one side of a strip of welting, and a movable carrier provided with a welt guide and a feed roll, said feed roll cooperating with the support to feed the welt.

10. A welt grooving and beveling machine having, in combination, a welt supporting roll, guides for positioning the welt on the support with its inner edge projecting over the end of the roll, a feed roll cooperating with the supporting roll and extending completely across the welt, a grooving knife at the rear of the rolls with its cutting edge close to the bite of the rolls, and a beveling knife acting on the welt close to the bite of the rolls.

11. A machine for operating on welting having, in combination, a welt supporting roll, guides for positioning the welt on the support with its inner edge projecting over the end of the roll, a feed roll cooperating with the supporting roll and extending completely across the welt, grooving and beveling knives acting on the welt close to the bite of the rolls, and a second feed roll at the rear of the knives to draw the welt past the knives.

12. A machine for operating on welting having, in combination, a comparatively large welt supporting roll, comparatively small feed rolls cooperating with the supporting roll, a grooving knife acting on the welt between the feed rolls, and means for forcing the feed rolls toward the supporting roll while permitting them to yield independently of each other.

13. A machine for operating on welting having, in combination, a welt support, a movable carrier, a welt guide mounted on the carrier, a feed roll mounted on the carrier and extending completely across the welt to cooperate with the support to feed the welt, and a knife to cut a groove in the welt having its cutting edge positioned close to the bite of the roll.

THOMAS H. SEELY.
RALPH C. SIMMONS.